United States Patent
Dykhouse

(10) Patent No.: US 9,481,304 B2
(45) Date of Patent: Nov. 1, 2016

(54) AUTOMOTIVE EXTERIOR MIRROR HEATER CONTROL

(75) Inventor: Robert J. Dykhouse, Byron Center, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 1343 days.

(21) Appl. No.: 13/111,407

(22) Filed: May 19, 2011

(65) Prior Publication Data

US 2011/0286096 A1    Nov. 24, 2011

Related U.S. Application Data

(60) Provisional application No. 61/347,691, filed on May 24, 2010.

(51) Int. Cl.
    *B60R 1/06* (2006.01)
    *G02B 7/18* (2006.01)

(52) U.S. Cl.
    CPC .......... *B60R 1/0602* (2013.01); *G02B 7/1815* (2013.01)

(58) Field of Classification Search
    CPC ...... B60R 1/06; B60R 1/0602; G02B 7/1815
    USPC ................................. 359/507, 512; 219/219
    See application file for complete search history.

(56) References Cited

U.S. PATENT DOCUMENTS

| | | |
|---|---|---|
| 2,263,382 A | 11/1941 | Gotzinger |
| 2,580,014 A | 12/1951 | Gazda |
| 3,266,016 A | 8/1966 | Maruyama et al. |
| 3,280,701 A | 10/1966 | Donnelly et al. |
| 4,435,042 A | 3/1984 | Wood et al. |
| 4,436,371 A | 3/1984 | Wood et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,634,242 A * | 1/1987 | Taguchi et al. ............... 359/512 |
| 4,679,906 A | 7/1987 | Brandenburg |
| 4,712,879 A | 12/1987 | Lynam et al. |
| 4,721,364 A | 1/1988 | Itoh et al. |
| 4,773,740 A | 9/1988 | Kawakami et al. |
| 4,793,690 A | 12/1988 | Gahan et al. |
| 4,799,768 A | 1/1989 | Gahan |
| 4,826,289 A | 5/1989 | Vandenbrink et al. |
| 4,827,086 A | 5/1989 | Rockwell |
| 4,855,550 A | 8/1989 | Schultz, Jr. |

(Continued)

FOREIGN PATENT DOCUMENTS

DE                10058434 A1 *  6/2002

*Primary Examiner* — Ricky D Shafer
(74) *Attorney, Agent, or Firm* — Gardner, Linn, Burkhart & Flory, LLP

(57) ABSTRACT

An exterior rearview mirror system suitable for use on a vehicle includes an exterior rearview mirror assembly, a mirror heating element and a control. The mirror assembly includes a mirror head portion mountable to a side of a vehicle and a reflective element supported at the mirror head portion. The mirror heating element is disposed at a rear side of the reflective element and operable to heat the reflective element. The control is operable to power the mirror heating element to heat the reflective element. The control controls heating of the mirror heating element responsive at least in part to a signal indicative of air flow at or around the exterior rearview mirror assembly and the reflective element of the equipped vehicle.

19 Claims, 4 Drawing Sheets

(56) References Cited

U.S. PATENT DOCUMENTS

| | | | |
|---|---|---|---|
| 4,859,813 A | 8/1989 | Rockwell | |
| 4,882,466 A | 11/1989 | Friel | |
| 4,882,565 A | 11/1989 | Gallmeyer | |
| 4,906,085 A | 3/1990 | Sugihara et al. | |
| 4,948,242 A | 8/1990 | Desmond et al. | |
| 5,014,167 A | 5/1991 | Roberts | |
| 5,037,189 A * | 8/1991 | Fujie et al. | 359/507 |
| 5,066,112 A | 11/1991 | Lynam et al. | |
| 5,073,012 A | 12/1991 | Lynam | |
| 5,076,673 A | 12/1991 | Lynam et al. | |
| 5,078,480 A | 1/1992 | Warszawski | |
| 5,079,406 A * | 1/1992 | Nagy | 219/219 |
| 5,115,346 A | 5/1992 | Lynam | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,151,824 A | 9/1992 | O'Farrell | |
| 5,155,625 A * | 10/1992 | Komatsu et al. | 359/512 |
| 5,178,448 A | 1/1993 | Adams et al. | |
| 5,179,471 A | 1/1993 | Caskey et al. | |
| 5,183,099 A | 2/1993 | Bechu | |
| 5,189,537 A | 2/1993 | O'Farrell | |
| 5,193,029 A | 3/1993 | Schofield et al. | |
| 5,207,492 A | 5/1993 | Roberts | |
| 5,233,461 A | 8/1993 | Dornan et al. | |
| 5,253,109 A | 10/1993 | O'Farrell et al. | |
| 5,285,060 A | 2/1994 | Larson et al. | |
| 5,313,335 A | 5/1994 | Gray et al. | |
| 5,327,288 A | 7/1994 | Wellington et al. | |
| 5,354,965 A | 10/1994 | Lee | |
| 5,355,245 A | 10/1994 | Lynam | |
| 5,406,414 A | 4/1995 | O'Farrell et al. | |
| 5,437,931 A | 8/1995 | Tsai et al. | |
| 5,446,576 A | 8/1995 | Lynam et al. | |
| 5,481,409 A | 1/1996 | Roberts | |
| 5,509,606 A | 4/1996 | Breithaupt et al. | |
| 5,523,877 A | 6/1996 | Lynam | |
| 5,525,264 A | 6/1996 | Cronin et al. | |
| 5,535,056 A | 7/1996 | Caskey et al. | |
| 5,550,677 A | 8/1996 | Schofield et al. | |
| 5,567,360 A | 10/1996 | Varaprasad et al. | |
| 5,575,552 A | 11/1996 | Faloon et al. | |
| 5,587,236 A | 12/1996 | Agrawal et al. | |
| 5,587,699 A | 12/1996 | Faloon et al. | |
| 5,594,222 A | 1/1997 | Caldwell | |
| 5,607,538 A | 3/1997 | Cooke | |
| 5,610,380 A | 3/1997 | Nicolaisen | |
| 5,610,756 A | 3/1997 | Lynam et al. | |
| 5,649,756 A | 7/1997 | Adams et al. | |
| 5,668,663 A | 9/1997 | Varaprasad et al. | |
| 5,669,698 A | 9/1997 | Veldman et al. | |
| 5,689,370 A | 11/1997 | Tonar et al. | |
| 5,703,731 A | 12/1997 | Boddy et al. | |
| 5,724,187 A | 3/1998 | Varaprasad et al. | |
| 5,751,489 A | 5/1998 | Caskey et al. | |
| 5,788,357 A | 8/1998 | Muth et al. | |
| 5,790,298 A | 8/1998 | Tonar | |
| 5,808,777 A | 9/1998 | Lynam et al. | |
| 5,821,501 A * | 10/1998 | Zorn | 219/219 |
| 5,877,897 A | 3/1999 | Schofield et al. | |
| 5,900,999 A | 5/1999 | Huizenga et al. | |
| 5,910,854 A | 6/1999 | Varaprasad et al. | |
| 5,922,176 A | 7/1999 | Caskey | |
| 5,938,320 A | 8/1999 | Crandall | |
| 5,986,364 A | 11/1999 | Bingle et al. | |
| 6,001,486 A | 12/1999 | Varaprasad et al. | |
| 6,002,544 A | 12/1999 | Yatsu | |
| 6,005,724 A | 12/1999 | Todd | |
| 6,065,840 A | 5/2000 | Caskey et al. | |
| 6,111,684 A | 8/2000 | Forgette et al. | |
| 6,154,306 A | 11/2000 | Varaprasad et al. | |
| 6,164,564 A | 12/2000 | Franco et al. | |
| 6,172,613 B1 | 1/2001 | DeLine et al. | |
| 6,178,034 B1 | 1/2001 | Allemand et al. | |
| 6,196,688 B1 | 3/2001 | Caskey et al. | |
| 6,207,083 B1 | 3/2001 | Varaprasad et al. | |
| 6,213,612 B1 | 4/2001 | Schnell et al. | |
| 6,229,226 B1 | 5/2001 | Kramer et al. | |
| 6,243,218 B1 | 6/2001 | Whitehead | |
| 6,245,262 B1 | 6/2001 | Varaprasad et al. | |
| 6,257,746 B1 | 7/2001 | Todd et al. | |
| 6,260,608 B1 | 7/2001 | Kim | |
| 6,286,965 B1 | 9/2001 | Caskey et al. | |
| 6,310,611 B1 | 10/2001 | Caldwell | |
| 6,312,135 B1 | 11/2001 | Polzer | |
| 6,318,870 B1 | 11/2001 | Spooner et al. | |
| 6,320,282 B1 | 11/2001 | Caldwell | |
| 6,329,925 B1 | 12/2001 | Skiver et al. | |
| 6,356,376 B1 | 3/2002 | Tonar et al. | |
| 6,362,548 B1 | 3/2002 | Bingle et al. | |
| 6,420,036 B1 | 7/2002 | Varaprasad et al. | |
| 6,426,485 B1 * | 7/2002 | Bulgajewski et al. | 219/219 |
| 6,428,172 B1 | 8/2002 | Hutzel et al. | |
| 6,441,964 B1 | 8/2002 | Chu et al. | |
| 6,449,082 B1 | 9/2002 | Agrawal et al. | |
| 6,467,920 B2 | 10/2002 | Schnell et al. | |
| 6,501,387 B2 | 12/2002 | Skiver et al. | |
| 6,512,203 B2 | 1/2003 | Jones et al. | |
| 6,512,624 B2 | 1/2003 | Tonar et al. | |
| 6,595,649 B2 | 7/2003 | Hoekstra et al. | |
| 6,615,438 B1 | 9/2003 | Franco et al. | |
| 6,627,918 B2 | 9/2003 | Getz et al. | |
| 6,642,851 B2 | 11/2003 | DeLine et al. | |
| 6,648,477 B2 | 11/2003 | Hutzel et al. | |
| 6,669,109 B2 | 12/2003 | Ivanov et al. | |
| 6,685,864 B2 | 2/2004 | Bingle et al. | |
| 6,690,268 B2 | 2/2004 | Schofield et al. | |
| 6,697,024 B2 | 2/2004 | Fuerst et al. | |
| 6,698,905 B1 | 3/2004 | Whitehead | |
| 6,717,109 B1 | 4/2004 | Macher et al. | |
| 6,719,215 B2 | 4/2004 | Drouillard | |
| 6,737,629 B2 | 5/2004 | Nixon et al. | |
| 6,742,904 B2 | 6/2004 | Bechtel et al. | |
| 6,755,544 B2 | 6/2004 | Schnell et al. | |
| D493,131 S | 7/2004 | Lawlor et al. | |
| D493,394 S | 7/2004 | Lawlor et al. | |
| 6,824,281 B2 | 11/2004 | Schofield et al. | |
| 6,831,268 B2 | 12/2004 | Bechtel et al. | |
| 6,834,969 B2 | 12/2004 | Bade et al. | |
| 6,916,100 B2 | 7/2005 | Pavao | |
| 7,004,592 B2 | 2/2006 | Varaprasad et al. | |
| 7,004,593 B2 | 2/2006 | Weller et al. | |
| 7,042,616 B2 | 5/2006 | Tonar et al. | |
| 7,080,914 B1 | 7/2006 | Boddy | |
| 7,093,946 B2 | 8/2006 | Barve et al. | |
| 7,104,663 B2 | 9/2006 | Whitehead | |
| 7,106,392 B2 | 9/2006 | You | |
| 7,159,992 B2 | 1/2007 | Foote | |
| 7,184,190 B2 | 2/2007 | McCabe et al. | |
| 7,195,381 B2 | 3/2007 | Lynam et al. | |
| 7,244,912 B1 | 7/2007 | Rawlings | |
| 7,255,451 B2 | 8/2007 | McCabe et al. | |
| 7,267,449 B1 | 9/2007 | Boddy et al. | |
| 7,287,868 B2 | 10/2007 | Carter et al. | |
| 7,314,285 B2 | 1/2008 | Ruse et al. | |
| 7,400,435 B2 | 7/2008 | Byers et al. | |
| 7,533,718 B2 * | 5/2009 | Straub | 165/202 |
| 7,605,348 B2 | 10/2009 | Byers et al. | |
| 7,626,749 B2 | 12/2009 | Baur et al. | |
| 7,710,631 B2 | 5/2010 | McCabe et al. | |
| 7,800,019 B2 | 9/2010 | Byers et al. | |
| 7,858,905 B2 | 12/2010 | Rawlings | |
| 7,910,859 B2 | 3/2011 | Byers et al. | |
| 2002/0036828 A1 | 3/2002 | Wong | |
| 2002/0126054 A1 | 9/2002 | Fuerst et al. | |
| 2002/0154379 A1 | 10/2002 | Tonar et al. | |
| 2002/0159270 A1 | 10/2002 | Lynam et al. | |
| 2003/0043589 A1 | 3/2003 | Blank | |
| 2003/0101749 A1 | 6/2003 | Lingle et al. | |
| 2004/0032638 A1 | 2/2004 | Tonar et al. | |
| 2004/0032676 A1 | 2/2004 | Drummond et al. | |
| 2004/0094529 A1 * | 5/2004 | Richter | 219/202 |
| 2004/0165248 A1 | 8/2004 | Tonar | |
| 2004/0264011 A1 | 12/2004 | Lynam | |

(56) References Cited

U.S. PATENT DOCUMENTS

| | | |
|---|---|---|
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2006/0050018 A1 | 3/2006 | Hutzel et al. |
| 2006/0050356 A1 | 3/2006 | Varaprasad et al. |
| 2006/0061008 A1 | 3/2006 | Karner et al. |
| 2006/0098289 A1 | 5/2006 | McCabe et al. |
| 2006/0126150 A1 | 6/2006 | Tonar et al. |
| 2006/0164230 A1 | 7/2006 | DeWind et al. |
| 2006/0255960 A1 | 11/2006 | Uken et al. |
| 2007/0002477 A1 | 1/2007 | Whitehead |
| 2008/0116191 A1* | 5/2008 | Allen et al. .................. 219/219 |
| 2009/0207514 A1 | 8/2009 | McCabe et al. |
| 2010/0182143 A1 | 7/2010 | Lynam |
| 2011/0194203 A1 | 8/2011 | Foote et al. |

* cited by examiner

AUTOMOTIVE EXTERIOR MIRROR HEATER CONTROL

CROSS REFERENCE TO RELATED APPLICATION

The present application claims the filing benefit of U.S. provisional application Ser. No. 61/347,691, filed May 24, 2010, which is hereby incorporated herein by reference in its entirety.

FIELD OF THE INVENTION

The present invention relates to exterior rearview mirror assemblies and, more particularly, to an exterior rearview mirror assembly that has a heater element at its reflective element to heat the reflective element.

BACKGROUND OF THE INVENTION

It is known to provide a vehicular exterior rearview mirror assembly that has a mirror casing and reflective element that are adjustable relative to the side of the vehicle to which the mirror assembly is mounted, with a heater pad disposed at the rear of the reflective element. Such automotive exterior rearview mirrors are often heated for the purpose of clearing frost and ice from the viewing surface. The wattage to do this in an acceptable amount of time may, in some situations, over heat the mirror glass substrate, which may cause cracking or failure of the glass substrate or substrates of the mirror reflective element.

SUMMARY OF THE INVENTION

The present invention provides an exterior rearview mirror assembly that has a reflective element and mirror casing or head portion, with a heater pad disposed in the mirror casing and at the rear of the reflective element. The heater pad is powered and controlled by a control or control system that powers and controls the heater pad responsive to a sensed speed of travel of the vehicle and/or responsive to a sensed temperature at the heater pad or mirror substrate.

According to an aspect of the present invention, an exterior rearview mirror system suitable for use on a vehicle includes an exterior rearview mirror assembly having a mirror head portion mountable to a side of a vehicle and a reflective element supported at the mirror head portion. A mirror heating element is disposed at a rear side of the reflective element and is operable to heat the reflective element. A control is operable to power the mirror heating element to heat the reflective element. The control controls or adjusts heating of the mirror heating element responsive at least in part to a speed or motion or air flow signal indicative of a speed of travel or movement of the equipped vehicle or the air flow at or near or surrounding the equipped vehicle.

Optionally, the control may control heating of the mirror heating element responsive at least in part to a temperature signal indicative of a temperature at or on the reflective element, wherein the temperature signal may be generated by a thermistor disposed at or in the mirror heating element. Optionally, the speed signal or input received by the control may be generated by or may be responsive to a wheel speed sensor of the vehicle. For example, the control may reduce power applied to the mirror heating element following a period of time while the speed signal is indicative of there being little or no vehicle movement detected. The control may also be responsive to an ambient temperature signal indicative of a detected ambient temperature at or near the exterior mirror assembly. The control may comprise a body microcontroller of the equipped vehicle and/or an exterior mirror microcontroller of the exterior rearview mirror assembly of the equipped vehicle.

These and other objects, advantages, purposes and features of the present invention will become apparent upon review of the following specification in conjunction with the drawings.

DESCRIPTION OF THE PREFERRED EMBODIMENTS

Figure 1:
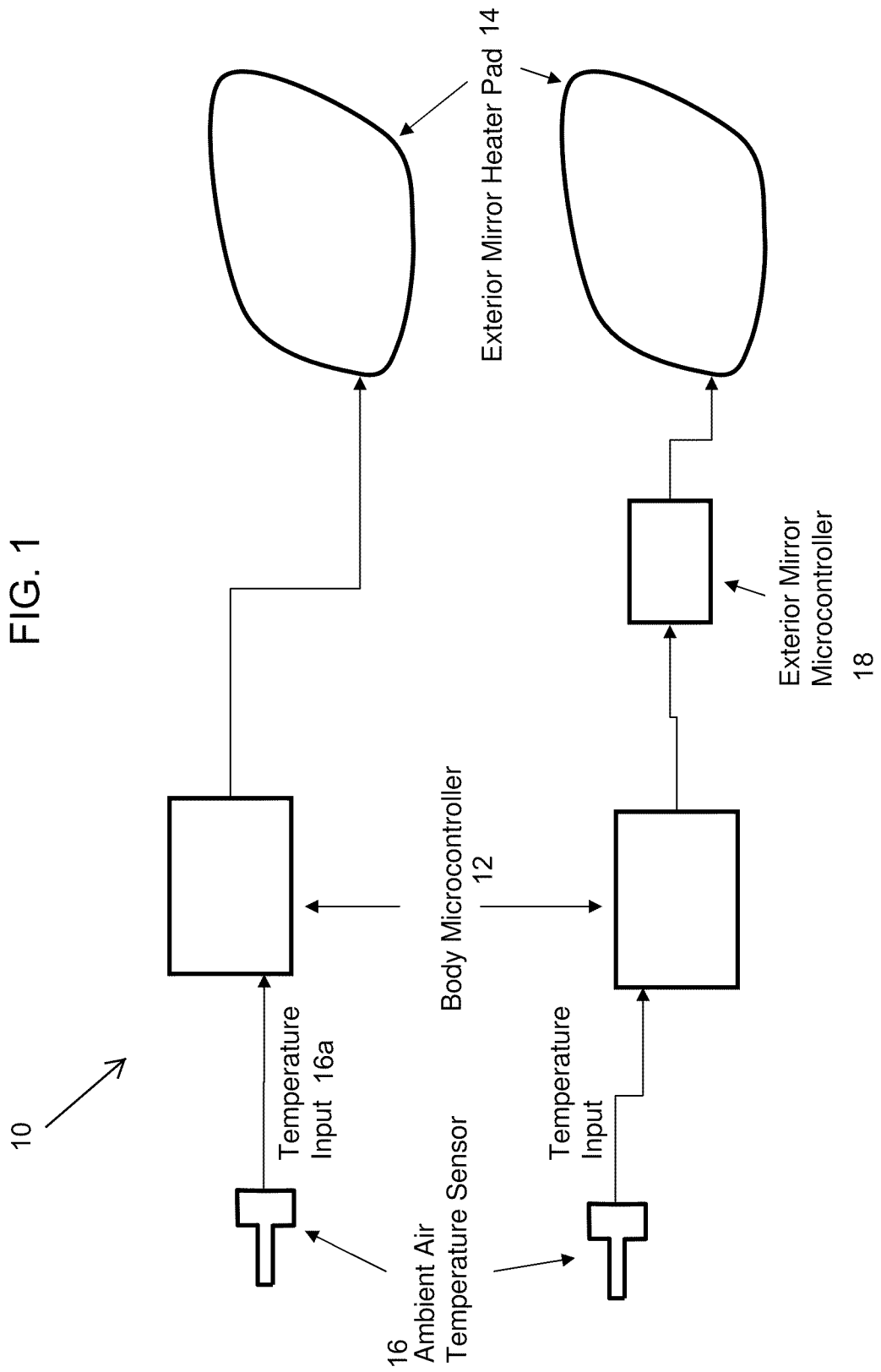
FIG. 1 is a schematic of an exterior mirror heating system that is responsive to an ambient temperature sensor.

Referring now to the drawings and the illustrative embodiments depicted therein, an exterior rearview mirror heating system 10 includes a body microcontroller or control 12 that is operable to control or power a heater or heating element or pad 14 (such as a resistive heating element that heats when powered, such as when the ignition is on and/or the engine is running) at one or more exterior rearview mirror assemblies of a vehicle (FIG. 1). The control 12 is responsive to a temperature input 16a from an ambient air temperature sensor 16, and controls or powers the heater or heating element or elements or heater pad or pads 14 in accordance with the sensed or detected ambient temperature at or near the exterior rearview mirror assembly. Optionally, the body control or microcontroller 12 may communicate with an exterior mirror control or microcontroller 18, whereby the exterior mirror control 18 is operable to power or control the heater element or elements 14 in response to the communication from the body control or microcontroller 12 and temperature sensor or sensors 16.

The control may operate to limit the glass temperature during the heating process to avoid overheating of the glass substrate of the reflective element of the exterior rearview mirror assembly. Control systems thus may use ambient temperature sensor inputs to a control or microcontroller. The microcontroller then adjusts the input power to the heater pad or pads based on the ambient temperature. For example, if the ambient temperature is, for example, about 37 degrees F., the control may not power the mirror heating element, and when the ambient temperature falls below about 37 degrees F., the control may progressively or algorithmically power (such as via pulse width modulation (PWM)) the mirror heating element depending on the measured or determined temperature (with only partial power applied at or near about 37 degrees F. and more power to full power applied as the temperature decreases toward about 0 degrees F.). These systems work well in some conditions, such as when the vehicle is started and driven, thereby creating air flow across the ambient temperature sensor and exterior mirror. The airflow provides good sensing of the ambient temperature and cooling of the mirror glass.

The exterior heater pad control system 10 thus is responsive to the sensed ambient temperature and relies on relatively accurate ambient temperature sensing without other inputs. However, if the vehicle is soaked at low temperatures and then moved into a warmer environment, but not driven to provide increased air flow at and around the temperature sensors, the vehicle mass (which is still at or near the lower soaked temperature) will keep the temperature sensor well below the temperature of the warmer environment. Such a condition may result in the microcontroller algorithm applying more power to the heater pad or pads than necessary, which in turn may result in overheating the mirror glass at the heater pads. Such overheating, particularly for thinner glass substrates (such as for electrochromic reflective elements, such as laminate electrochromic reflective elements such as described in U.S. Pat. No. 5,724,187, which is hereby incorporated herein by reference in its entirety, where the glass substrates may have a thickness of around 1.6 mm or around 1.1 mm or thereabouts), may result in cracking of the glass substrate or substrates due to thermal differences and/or thermal gradients at the glass substrate. Such overheating may occur when the engine is running and the heating element is powered and may occur when the vehicle is idling and/or is stationary and/or slowly or barely moving (such as can occur in the likes of slowed or stalled traffic or when movement on the road is restricted, such as in a funeral procession or the like), where there is little or reduced air flow over and around the exterior mirror assembly.

Figure 2:
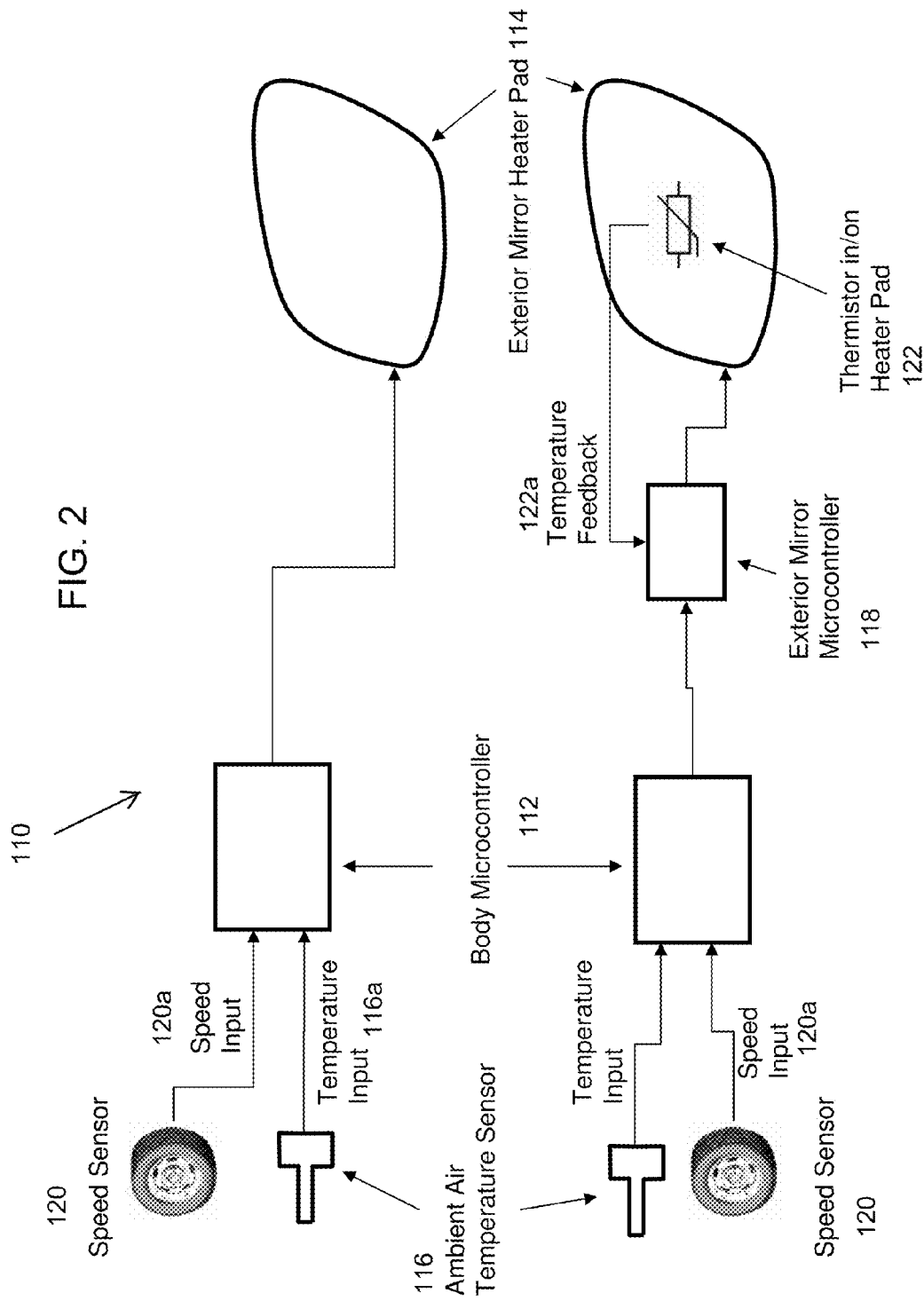
FIG. 2 is a schematic of an exterior mirror heating system in accordance with the present invention.
Figure 3:
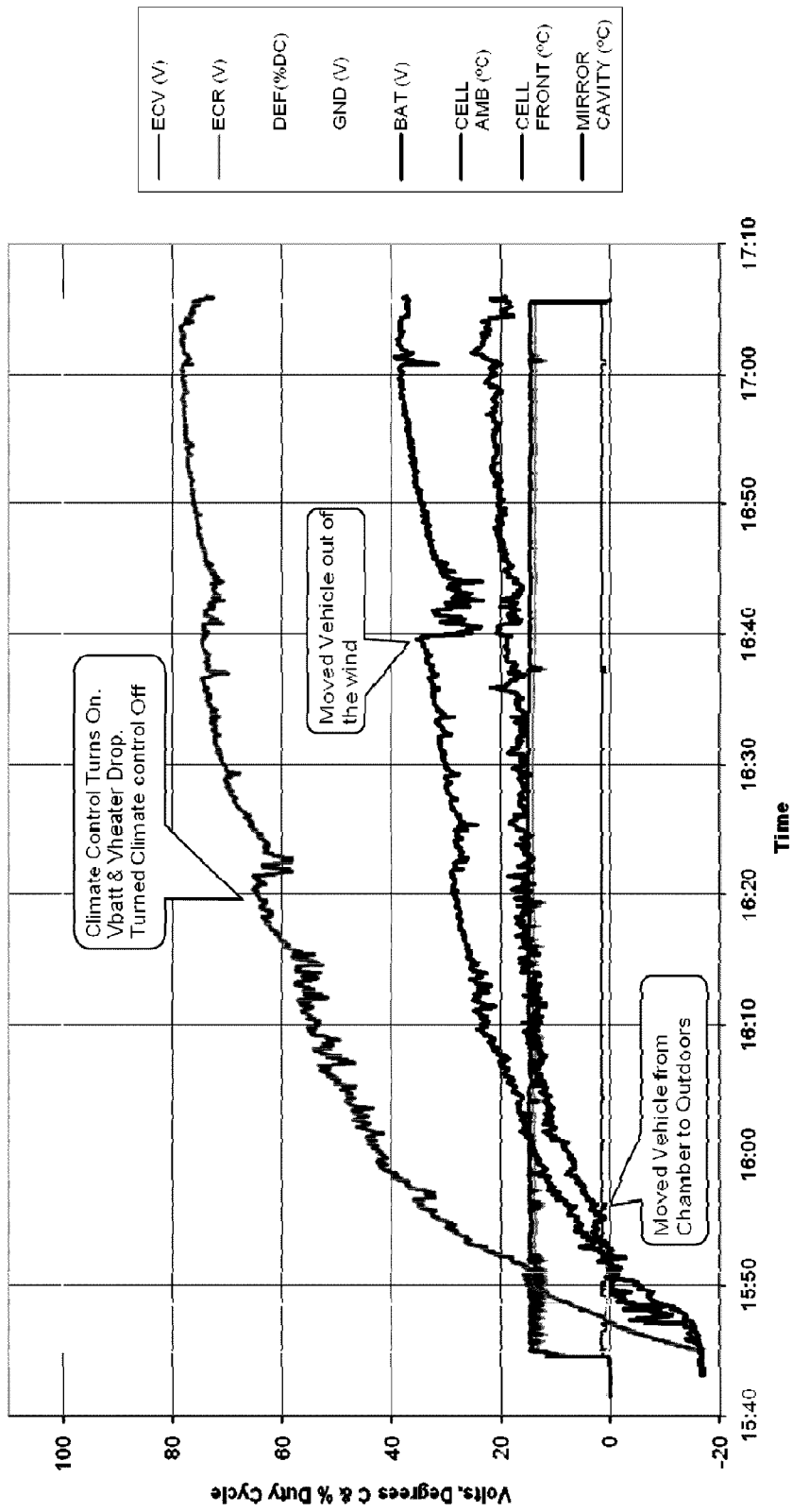
FIGS. 3 and 4 are graphs showing operation of a typical control system, with FIG. 4 showing the temperatures at the front and rear of the cell reaching higher temperatures when the vehicle is not moving.

Optionally, and with reference to FIG. 2, an exterior rearview mirror heating system 110 includes a body microcontroller or control 112 that is operable to control or power a heater pad or heating element 114 at one or more exterior rearview mirror assemblies of a vehicle (such as a resistive heating element disposed at or near a rear portion of the mirror reflective element of an exterior rearview mirror assembly). And being a resistive heater, heating of the heater element is achieved via ohmic resistance and follows the equation: Power (Watts)=Voltage applied (typically at ignition voltage of 9-16 Volts and 12 V nominally)*Current passed (Amps). Optionally, the resistive heater may comprise an ohmic resistive heater pad that continues to heat when powered, with a thermistor or the like that cuts off or signals when the heater pad reaches a threshold or maximum temperature, or the heater pad may comprise a PTC (positive temperature coefficient) heater pad, where the resistance of the pad increases as it heats, and thus the pad provides its own thermal cutoff as the resistance reaches a threshold or maximum level.

The control 112 is responsive to a temperature input 116a from an ambient air temperature sensor 116 (such as a thermistor or a thermocouple or RTD sensor or the like), and is further responsive to a vehicle speed input 120a from one or more wheel speed sensors or other speed sensing means or devices 120 (or other input indicative of movement of the vehicle and/or air flow over and around the exterior rearview mirror assembly and reflective element, such as an air flow sensor at an exterior portion of the vehicle, such as at the grille of the vehicle or such as at the exterior rearview mirror of the vehicle or elsewhere at the vehicle, depending on the particular application of the heater pad control system), and controls or powers the heater pad or pads 114 in accordance with the sensed or detected ambient temperature at or near the exterior rearview mirror assembly and in accordance with the travel speed of the vehicle (or air flow or air speed at the vehicle). Optionally, the body control or microcontroller 112 may communicate with an exterior mirror control or microcontroller 118, whereby the exterior mirror control 118 is operable to power or control the heater pad or pads 114 in response to the communication from the body control or microcontroller 112 and temperature sensor or sensors 116 and speed sensor or sensors 120. The power provided to the heater thus is dynamically related to movement of the vehicle and/or air flow over and around the mirror assembly and reflective element.

Thus, the control or controller is responsive at least in part to a signal indicative of air flow at the vehicle or at the exterior mirror of the vehicle and a signal indicative of the ambient or external temperature at the vehicle or at the exterior mirror of the vehicle. For example, the control may be responsive to a vehicle speed input (such as from an existing speed sensor or wheel sensor of the vehicle or the like) and may be responsive to an air temperature signal, such as from a variety of temperature sensing means disposed around the vehicle that give external temperature. Such thermistors or temperature sensors are commonly disposed sometimes at the grille of the vehicle or elsewhere at the vehicle (such as, for example, a thermistor at the exterior mirror that protrudes into the slip stream at the exterior mirror to determine temperature at or near the exterior mirror of the vehicle). The control system of the present invention may utilize the measured or known temperature (or signal indicative thereof) and the measured or known vehicle speed (or signal indicative thereof) from vehicle-based sensors at the vehicle (and not incorporated into the rearview mirror assembly), or the exterior rearview mirror assembly may include such air flow sensors and/or thermistors so that the control system is incorporated into the exterior rearview mirror assembly. Because the vehicle or vehicle control knows the temperature and vehicle speed, the heater pad control system can use existing temperature inputs and speed inputs for controlling the mirror heater pad. Optionally, a combination of speed sensing means and temperature sensing means may generate a signal indicative of air flow, and/or the heater pad control may factor in the ambient temperature and speed of the vehicle in controlling the heater pad operation.

The heater pad or element at the rear surface of the glass substrate may comprise a mirror defrost/demisting heater such as a heater pad or a heater film or a heater element, and may provide an anti-fogging of de-fogging feature to the exterior mirror assembly, and may utilize aspects of the heater elements or pads described in U.S. Pat. Nos. 7,400, 435; 5,808,777; 5,610,756 and/or 5,446,576, and/or U.S. patent applications Ser. No. 12/446,507, filed Apr. 21, 2009 now U.S. pat No. 8,058,977; and/or Ser. No. 11/779,047, filed Jul. 17, 2007, and published Jan. 17, 2008 as U.S. Pat. Publication No. 20080011733, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

Figure 4:
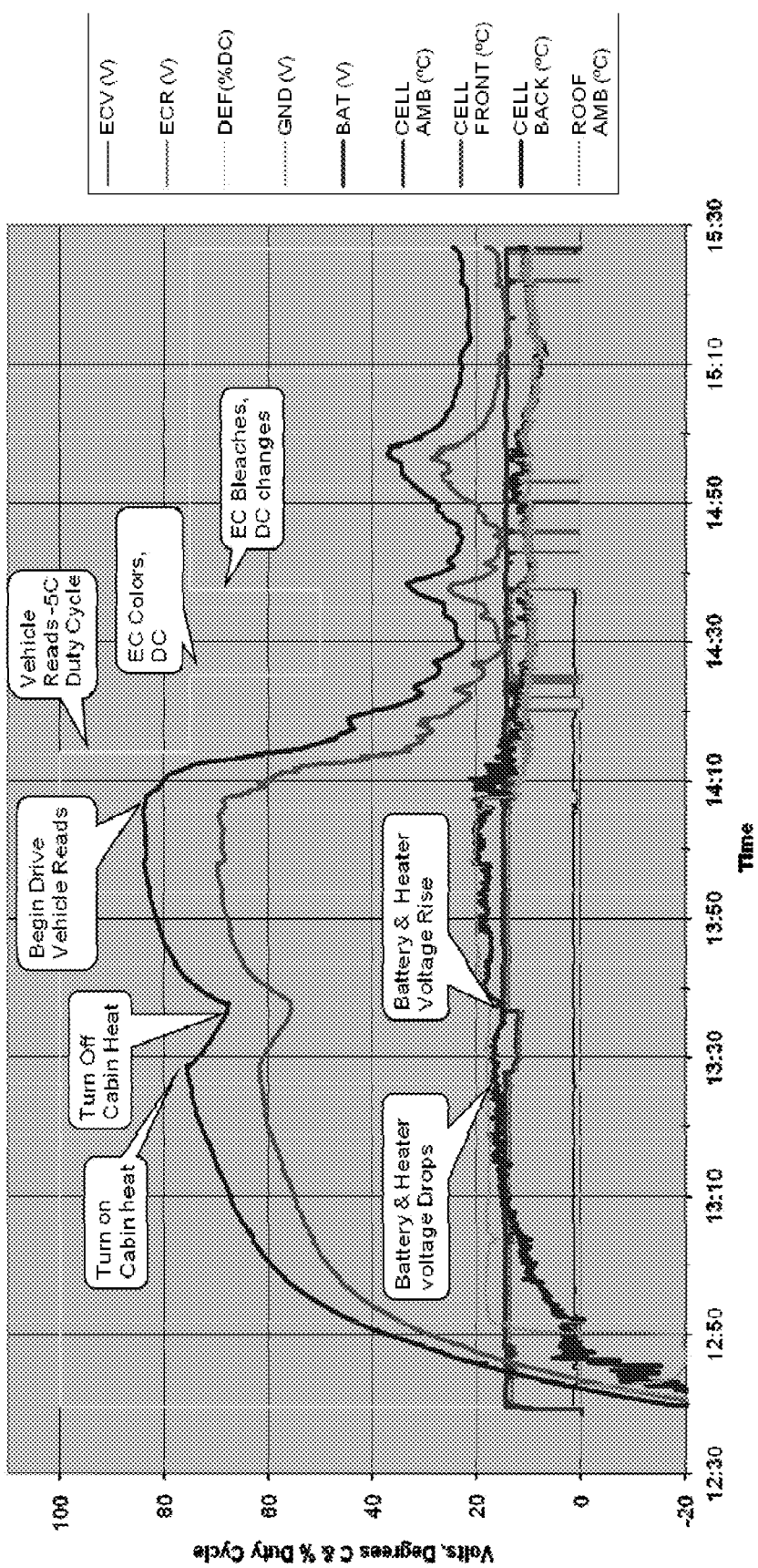

The heating system 110 of the present invention thus adds a vehicle speed input or airflow input to the heater pad power control algorithm, which provides an improved or enhanced algorithm that is operable to reduce the heater pad power after a short period of time has elapsed if there is no significant vehicle movement detected (thereby avoiding the high temperatures achieved at the mirror reflective element or cell such as shown in FIG. 4 when the vehicle is not moving). The present invention thus may provide enhanced control of the temperature profile at the front and rear of the mirror reflective element and may limit or reduce the maximum temperature reached at the reflective element, such as when the vehicle is not moving and the control is operating to heat the heater pad. Thus, the present invention may limit or substantially preclude overheating of the reflective element glass during situations where the ambient temperature is below a threshold level and the vehicle is not moving for a sustained period of time. The control algorithm can be adjusted to adapt the heating profile for various glass substrate sizes and shapes as required and depending on the particular application of the heating system.

Optionally, a thermistor or temperature sensor 122 may be disposed at or embedded in the heater pad 114, whereby a temperature reading or signal 122a (that is indicative of the temperatures of the heater pad and/or glass substrate) is communicated to or fed back to the mirror control 118 (or body control 112), thereby allowing the control to sense the temperature of the glass substrate and adjust or control the heating profile accordingly. The control thus may monitor the temperature at or of the mirror substrate and may reduce heating of the heater pad in response to the sensed mirror substrate or heater pad temperature being at or above a threshold temperature. The control may be responsive to the mirror substrate temperature signal or input 122a and/or the ambient temperature signal or input 116 and/or the vehicle speed signal or input 120a, The exterior mirror heater pad may be controlled via a body microcontroller or control 112 or a mirror microcontroller or control 118 (either or both being responsive to the inputs 116, 120a and/or 122a) located at or in the exterior mirror assembly or elsewhere on or in the vehicle. Thus, the mirror substrate temperature sensing and input feature of the present invention and the vehicle speed sensing and input feature of the present invention may be used together or separately in an exterior rearview mirror heating system, while remaining within the spirit and scope of the present invention.

Testing has revealed that overvoltage or extreme heating of the mirror glass substrates in cold temperature conditions with on/off cycling at 30 V and about −35 degrees C. and sprayed water may induce cracking of the mirror substrate or substrates, even with thicker back glass substrates (such as glass substrates having a thickness of about 2.3 mm or more or less). From the various failure rates it was concluded that the test threshold that would not crack the most robust electrochromic glass assemblies was about 25.5 V, at about −35 degrees C. for 5 minutes on and 10 minutes off, and with about 1 gram of water sprayed on the mirror substrate about every 2 hours or thereabouts. Thus, the heater wattage may be reduced and the specifications for clearing the glass substrate be changed to accommodate slower, more even heating times, and preferably the system will not allow the heater pad or element to heat the mirror glass indefinitely while the vehicle is stationary or otherwise does not have sufficient air flow over and around the mirror assembly and reflective element.

Testing has shown that a typical heater pad or element may heat the electrochromic glass substrates to temperatures that may exceed about 70 degrees C. or about 80 degrees C. or higher (such as when the vehicle is not moving and such as shown in FIG. 4). The control system of the present invention may adjust the degree or level of heating generated by the heater pad to progressively or algorithmically reduce the amount of heating to the glass substrate or substrates of the mirror reflective element, such as in response to the speed of the vehicle or air speed or flow around the mirror assembly. For example, if the detected speed is less than about 60 km/hr, the control may reduce the applied power to about 25 percent to about 50 percent of the full powered heating initially applied to the heater pad. If the system determines that there is no vehicle movement detected for a period of time, the control system may further reduce powering or may shut down or stop powering the heater pad (such as after about 3 minutes to about 10 minutes or thereabouts). Optionally, the communication module or interface in the minor assembly may control the duty cycle of the heater pad with a closed loop feed back from a thermistor or the like at or in the glass and heater pad assembly.

Thus, the control module or system of the present invention may adjust the percent of heater pad power (relative to full power or the maximum power typically applied to the heater pad) responsive to the ambient temperature and driving/air flow conditions and/or glass substrate temperature. Optionally, the interface between the mirror and the vehicle control unit may be a vehicle bus, such as a CAN or LIN bus. The transmitter/master of the LIN messages received by the vehicle control module is an electronic control unit (ECU). For example, if the detected or sensed or determined temperature is at or below about 5 degrees C., the control may power the heater pad at about 100 percent, but if the temperature is between about 5 degrees C. and about 10 degrees C., the control may power the heater pad at about 75 percent, and if the temperature is between about 10 degrees and about 15 degrees C., the control may power the heater pad at about 25 or 50 percent (and may adjust or increase the heating power if the wipers are activated), and if the temperature is greater than about 15 degrees C., the control may not power the heater pad or may power the heater pad at about 25 percent.

For example, if the outdoor temperature is about 7 degrees C., then the ECU will send the LIN Signal to the mirror with a heater requirement of 75 percent (of the maximum specified heater power for the particular mirror reflective element and the particular vehicle, which may be about 30 watts or thereabouts). The mirror-electronic module or control (such as a LIN bus module) receives the requirement signal, and the bus module switches on the heater pad and measures the voltage and current (on and through the heater), and the bus module calculates the required PWM on the heater pad to reach the 75 percent of the, for example, 30 W maximum power. In such an application, the bus module would then provide 22.5 W to the heater pad. For example, the bus module may measure a voltage of 13 V and a current of 1.8 A, and may calculate 13 V*1.8 A=23.4 W. If there is no EC function activated (such as from the vehicle control module over the LIN bus), the bus module may calculate the PWM to the heater to be 22,5/23.4=96 percent PWM, but if there is an EC function from the car activated, then additional constant power will be produced on the EC resistor; and this real power will be calculated depending on [measured voltage, current and the parameter Rec/Rht (in the EOL-Parameter)]. This calculated power on the EC resistor (X) may be deducted from the required power (22.5 W-X W), and then the heater PWM for the rest power will be calculated the same way as before.

Although the above is one possible example, there are many combinations of determining the required heater power from the vehicle module over the LIN bus, the measured voltage and current, whether the EC function is on or off, the parameter Rec/Rht, the parameter max Heater Power (such as 30 W), while remaining within the spirit and scope of the present invention. If the LIN module loses communication with the vehicle control or module, it is envisioned that the control may deactivate all functions and the module may switch to a sleep mode (such as when there is no signal across the LIN bus) or in the absence of messages (such as due to the LIN master being switched to another LIN schedule without switching off the heater function explicitly), the heater may continue to be activated/powered. The LIN module may react only on the LIN-Signal-Changes, and there may be no control of the absence of the individual LIN messages, because there may not be a vehicle specification about switching between several LIN schedule tables (depending on the particular vehicle application).

Thus, the exterior rearview mirror assembly includes a heater element that is disposed at or established at the rear surface of the reflective element to reduce fogging of the reflective element. The exterior rearview mirror assembly may comprise any suitable mirror reflective element and housing and mounting configuration. Optionally, for example, the mirror reflector or reflective element may comprise a generally planar glass mirror substrate or substrates and may comprise a variably reflective, electro-optic reflective element (having a front and rear substrate with an electro-optic medium sandwiched therebetween) or a single substrate reflective element, while remaining within the spirit and scope of the present invention. The reflective element has a reflector coating for reflecting light incident thereon to provide a rearward field of view to the driver of the vehicle. The reflector coating is disposed at an appropriate surface of the reflective element.

Optionally, for example, the reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,255,451; 7,195,381; 6,690,268; 5,140,455; 5,151,816 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 11/226,628, filed Sep. 14, 2005 published on Mar. 23, 2006 as U.S. Publication No. 2006/0061008; and/or PCT Application No. PCT/US2006/018567, filed May 15, 2006 and published Nov. 23, 2006 as International Publication No. WO 2006/124682, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 7,274,501; 5,910,854 and 6,420,036, which are all hereby incorporated herein by reference in their entireties.

Optionally, conductive electrode coated glass substrates are commercially available from various sources. For example, tin oxide-coated glass substrates, known as "TEC-Glass" products, may be obtained from Libbey-Owens-Ford Co., LOF Glass Division, Toledo, Ohio, and such as described in U.S. Pat. No. 7,004,592, which is hereby incorporated herein by reference in its entirety, Such "TEC-Glass" products are manufactured by an on-line chemical vapor deposition process that pyrolytically deposits onto clear float glass a multi-layer thin film structure, which includes a microscopically thin coating of fluorine-doped tin oxide (having a fine grain uniform structure) with additional undercoating thin film layers disposed between the fluorine-doped tin oxide layer and the underlying glass substrate. The "TEC-Glass" substrates may be available in different thicknesses, such as 2 thick or 3 mm thick glass substrates and/or the like.

Optionally, use of an elemental semiconductor mirror, such as a silicon metal mirror, such as disclosed in U.S. Pat. Nos. 7,338,177; 6,286,965; 6,196,688; 5,535,056; 5,751,489; and 6,065,840, which are all hereby incorporated herein by reference in their entireties, can be advantageous because such elemental semiconductor minors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,255,451; 7,274,501 and 7,184,190, and/or U.S. patent application Ser. No. 11/226,628, filed Sep. 14, 2005 published on Mar. 23, 2006 as U.S. publication No. 2006/0061008, which are all hereby incorporated herein by reference in their entireties. Optionally, the reflective element may include indicia formed at and viewable at the reflective element, such as by utilizing aspects of the reflective elements described in U.S. Pat. No, 7,626,749, which is hereby incorporated herein by reference in its entirety.

Optionally, the reflective element may comprise a single substrate with a reflective coating at its rear surface. The minor assembly thus may comprise a prismatic minor assembly or planar or non-planar mirror or other mirror having a single substrate reflective element, such as a mirror assembly utilizing aspects of the mirror assemblies described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the reflective element may comprise a conventional prismatic or flat reflective element or prism, or may comprise a prismatic or flat reflective element of the types described in U.S. Pat. Nos. 7,289,037; 7,249,860; 7,255,451; 7,274,501; 7,338,177; and/or 7,420,756, which are all hereby incorporated herein by reference in their entireties.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties.

Optionally, an anti-reflective (AR) coating may be disposed on the front surface of the reflective element (the surface facing generally rearward with respect to the direction of travel of the vehicle when the minor assembly is mounted to the vehicle) to reduce glare at the viewed surface of the mirror reflective element (such as by utilizing aspects described in U.S. Pat. No. 5,076,674, and/or PCT Application No. PCT/US06/042718, filed Oct. 31, 2006, and published May 10, 2007 as International Publication No. WO 07/053710, which is hereby incorporated herein by reference in its entirety). Optionally, a hydrophilic and/or hydrophobic coating may be disposed on the front surface of the reflective element to limit water or moisture accumulation at the reflective element and wide angle portion thereof. Optionally, the reflective element may include an anti-static means, such as a conductive coating, particularly a substantially transparent conductive coating, such as ITO, tin oxide and/or the like; index matching means to reduce internal and interfacial reflections, such as thin films of an appropriately selected optical path length; and/or light absorbing glass, such as glass tinted to a neutral density, such as "GRAY-LITE" gray tinted glass (commercially available from Pittsburgh Plate Glass Industries) and "SUNGLAS" gray tinted glass (commercially available from Ford Glass Co., Detroit, Mich.), which assists in augmenting contrast enhancement. Optionally, polymer interlayers, which may be tinted gray (such as used in electrochromic devices as taught by and described in U.S. Pat. No. 4,712,879, which is hereby incorporated herein by reference in its entirety), may be incorporated into the electro-optic or electrochromic mirrors described herein.

The reflective element may be attached at or to a back plate, which is attached to the rear of the reflective element (such as via any suitable adhesive or the like), and is formed or configured to attach to the mirror head portion or to the actuator assembly. The actuator may comprise any suitable mirror actuator, and may utilize aspects of the mirror assemblies described in U.S. Pat. Nos. 7,314,285; 7,267,449; 7,159,992; 7,093,946; 7,080,914; 7,073,914; 7,104,663; 6,916,100; 6,755,544; 6,698,905; 6,685,864; 6,467,920; 6,362,548; 6,312,135; 6,243,218; 6,229,226; 6,213,612; 5,986,364; 5,900,999; and 5,703,731, and/or U.S. patent applications, Ser. No. 11/504,353, filed Aug. 15, 2006, and published Jan. 4, 2007 as U.S. Patent Publication No. US-2007-0002477, and/or Ser. No. 11/842,328, filed Aug. 21, 2007, now U.S. Pat. No. 7,722,199; and/or Ser. No. 13/023,747, filed Feb. 9, 2011, now U.S. Pat. No. 8,915,601, which are hereby incorporated herein by reference in their entireties. Optionally, the reflective element may be fixedly attached to the mirror head portion, such as via an adhesive or bonding material disposed between the rear surface of the reflective element and an attaching surface of the mirror head portion.

Optionally, the mirror head portion or mirror casing or a back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflective element may comprise a bezelless or frameless reflective element (such as the types described in U.S. Pat. Nos. 7,626,749; 7,184,190 and/or 7,255,451; and/or U.S. patent applications, Ser. No. 11/226,628, filed Sep. 14, 2005, published on Mar. 23, 2006 as U.S. Publication No. 2006/0061008, which are hereby incorporated herein by reference in their entireties), whereby the back plate may not include a perimeter framing portion or bezel portion around the perimeter of the reflective element.

Optionally, the mirror reflective element may comprise an electro-optic reflective element (but could comprise a non-electro-optic reflective element) having a front substrate, a rear substrate and an electro-optic medium (such as a solid polymer matrix electrochromic medium or the like) sandwiched therebetween and sealed via a perimeter seal. The front substrate has a transparent conductor coating (such as an indium tin oxide (ITO) coating or layer) disposed at its rear surface, while the rear substrate has a mirror reflector or coating (such as a non-dichroic transflector, such as an ITO/Ag/ITO stack of layers or coatings or a silicon metal reflector coating or the like) and a transparent conductor layer (such as an ITO or F-doped or As-doped tin oxide layer or the like) disposed at its front surface. The mirror reflective element thus may comprise a third surface electro-optic mirror reflective element (such as an electrochromic mirror element). The front and rear substrates may comprise generally planar mirror substrates or may have a slight radius of curvature to provide a wider angle field of view across the reflector portion depending on the particular application of the mirror reflective element and exterior rearview mirror assembly.

Optionally, the mirror assembly may include an indicator or illumination source (such as for backlighting an indicator or indicia at the reflective element), such as by utilizing aspects of the mirror assemblies described in U.S. Pat. Nos. 7,492,281; 6,919,796; 6,198,409; 5,929,786; and 5,786,772, and/or U.S. patent applications, Ser. No. 12/091,525, filed Apr. 25, 2008, now U.S. Pat. No. 7,855,755; and/or Ser. No. 12/446,507, filed Apr. 21, 2009, now U.S. Pat. No. 8,058, 977, and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, published on Apr. 16, 2009 as International Publication No. WO 2007/005942, and/or PCT Application No. PCT/US07/82099, filed Oct. 22, 2007, published on Jul. 31, 2008 as International Publication No. WO 2008/051910; and/or PCT Application No. PCT/US06/042718, filed Oct. 31, 2006 by Donnelly Corp. et al. for INTERIOR REARVIEW MIRROR WITH DISPLAY, published on Apr. 23, 2009 as International Publication No. WO 2007/053710, which are hereby incorporated herein by reference in their entireties.

Optionally, the mirror assembly and/or reflective element may include a wide angle reflector or blind spot viewing aid or the like to provide a wide angle field of view of the blind spot area at the side of the vehicle to the driver of the vehicle. Optionally, for example, the mirror assembly may utilize aspects of the reflectors or assemblies described in U.S. Pat. Nos. 7,255,451; 7,195,381; 6,717,712; 6,522,451; and/or 7,126,456, and/or U.S. patent application Ser. No. 12/187, 725, filed Aug. 07, 2008 now U.S. Pat. No. 8,786,704, and/or U.S. patent application Ser. No. 12/124,297, filed May 21, 2008, now U.S. Pat. No. 7,748,856, which are hereby incorporated herein by reference in their entireties.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 7,370,983; 7,274,501; 7,255,451; 7,184,190; 7,195,381; 6,690,268; 5,668,663 and/or 5,724, 187, and/or in U.S. patent applications, Ser. No. 10/538,724, filed Jun. 13, 2005, published on Mar. 9, 2006 as U.S. Publication No. 2006/0050018, which are all hereby incorporated herein by reference in their entireties, or may include or incorporate video displays or the like, such as the types described in U.S. Pat. No. 7,370,983, and/or U.S. patent application, Ser. No. 10/538,724, filed Jun. 13, 2005, published on Mar. 9, 2006 as U.S. Publication No. 2006/0050018, and/or U.S. provisional applications, Ser. No. 60/630,061, filed Nov. 22, 2004; and Ser. No. 60/667,048, filed Mar. 31, 2005, which are hereby incorporated herein by reference in their entireties.

Optionally, the mirror reflective element may comprise a transflective display on demand reflective element that is partially transmissive and partially reflective, so that the light emanating from the display element may be transmitted through the reflective element when an illumination source is activated, but the display is substantially non-visible or viewable when the illumination source is deactivated. Optionally, the mirror reflective element may comprise a single substrate or non-electro-optic reflective element, with the auxiliary wide angle reflector portion being integrally formed or established at a rear surface of the reflective element, while remaining within the spirit and scope of the present invention. For example, the reflective element may utilize aspects of the reflective elements described in U.S. Pat. Nos. 7,338,177; 7,274,501; 7,255,451; 7,184,190; 6,690,268; 5,668,663 and/or 5,724,187, which are all hereby incorporated herein by reference in their entireties.

Optionally, the mirror assembly may include a blind spot indicator and/or a turn signal indicator, such as an indicator or indicators of the types described in U.S. patent applications, Ser. No. 12/264,669, filed Nov. 4, 2008, now U.S. Pat. No. 7,944,371; and/or Ser. No. 12/446,507, filed Apr. 21, 2009, now U.S. Pat. No. 8,058,977, and/or U.S. Pat. Nos. 7,492,281; 6,198,409; 5,929,786; and 5,786,772, and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, published on Apr. 16, 2009 as International Publication No. WO 2007/005942, and/or PCT Application No. PCT/US07/82099, filed Oct. 22, 2007, published on Jul. 31, 2008 as International Publication No. WO 2008/051910, which are hereby incorporated herein by reference in their entireties. The signal indicator or indication module may include or utilize aspects of various light modules or systems or devices, such as the types described in U.S. Pat. Nos. 7,626,749; 7,581,859; 6,227,689; 6,582,109; 5,371,659; 5,497,306; 5,669,699; 5,823,654; 6,176,602; and/or 6,276,821, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,720,580; 7,038,577; 6,882,287; 6,198,409; 5,929,786; and 5,786,772, and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,720,580; 7,038,577; 6,882,287; 6,198,409; 5,929,786; and/or 5,786,772, and/or U.S. patent applications, Ser. No. 11/239,980, filed Sep. 30, 2005 by Camilleri et al. for VISION SYSTEM FOR VEHICLE, now U.S. Pat. No. 7,881,496; and/or U.S. provisional applications, Ser. No. 60/638,687, filed Dec. 23, 2004 by Higgins-Luthman for OBJECT DETECTION SYSTEM FOR VEHICLE; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 7,005,974; and/or 6,757,109, and/or of the automatic headlamp controls described in U.S. Pat, Nos. 7,526,103; 5,796,094 and/or 5,715,093, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 7,339,149; 5,550,677; 5,760,962; 6,097,023 and 5,796,094, and/or PCT Application No. PCT/US2003/036177 filed Nov. 14, 2003, published Jun. 3, 2004 as PCT Publication No. WO 2004/047421 A3, with all of the above referenced U.S. patents, patent applications and provisional applications and PCT applications being commonly assigned and being hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An exterior rearview mirror system suitable for use on a vehicle, said exterior rearview mirror system comprising:
   an exterior rearview mirror assembly having a reflective element supported at a mirror head portion mountable to a side of a vehicle equipped with said exterior rearview mirror system;
   a mirror heating element disposed at a rear side of said reflective element and operable to heat said reflective element; and a control operable to power said mirror heating element to heat said reflective element, wherein said control controls heating of said mirror heating element responsive at least in part to (i) a speed signal indicative of a speed of travel of the equipped vehicle and (ii) a temperature signal indicative of a temperature at or on said reflective element;

wherein, responsive to said control receiving a speed signal indicative of vehicle movement, said control powers said mirror heating element;

wherein, responsive to said control receiving a speed signal indicative of little or no vehicle movement for a predetermined period of time, said control reduces power applied to said mirror heating element; and wherein said control, responsive to said control receiving a speed signal indicative of little or no vehicle movement for a predetermined period of time of at least about three minutes, said control reduces power applied to said mirror heating element.

2. The exterior rearview mirror system of claim 1, wherein said control is responsive at least in part to an ambient temperature signal indicative of a detected ambient temperature at or near said mirror assembly.

3. An exterior rearview mirror system suitable for use on a vehicle, said exterior rearview mirror system comprising:

an exterior rearview mirror assembly having a reflective element supported at a mirror head portion mountable to a side of a vehicle equipped with said exterior rearview mirror system;

a mirror heating element disposed at a rear side of said reflective element and operable to heat said reflective element; and a control operable to power said mirror heating element to heat said reflective element, wherein said control controls heating of said mirror heating element responsive at least in part to (i) a speed signal indicative of a speed of travel of the equipped vehicle and (ii) a temperature signal indicative of a temperature at or on said reflective element;

wherein, responsive to said control receiving a speed signal indicative of vehicle movement, said control powers said mirror heating element;

wherein, responsive to said control receiving a speed signal indicative of little or no vehicle movement for a predetermined period of time, said control reduces power applied to said mirror heating element; and wherein said temperature signal is generated by a thermistor disposed at or in said mirror heating element.

4. The exterior rearview mirror system of claim 3, wherein said control, responsive to said control receiving a speed signal indicative of little or no vehicle movement for a predetermined period of time of less than about ten minutes, said control reduces power applied to said mirror heating element.

5. The exterior rearview mirror system of claim 4, wherein, responsive to said control receiving a speed signal indicative of little or no vehicle movement for a predetermined period of time of at least about three minutes, said control reduces power applied to said mirror heating element.

6. The exterior rearview mirror system of claim 3, wherein said control comprises a microcontroller of the equipped vehicle.

7. The exterior rearview mirror system of claim 3, wherein said control comprises an exterior mirror microcontroller of said exterior rearview mirror assembly of the equipped vehicle.

8. An exterior rearview mirror system suitable for use on a vehicle, said exterior rearview mirror system comprising:

an exterior rearview mirror assembly having a reflective element supported at a mirror head portion mountable to a side of a vehicle equipped with said exterior rearview mirror system;

a mirror heating element disposed at a rear side of said reflective element and operable to heat said reflective element; and a control operable to power said mirror heating element to heat said reflective element, wherein said control controls heating of said mirror heating element responsive at least in part to (i) a speed signal indicative of a speed of travel of the equipped vehicle and (ii) a temperature signal indicative of a temperature at or on said reflective element;

wherein, responsive to said control receiving a speed signal indicative of vehicle movement, said control powers said mirror heating element;

wherein, responsive to said control receiving a speed signal indicative of little or no vehicle movement for a predetermined period of time, said control reduces power applied to said mirror heating element; and wherein said mirror heating element comprises a PTC heating element.

9. An exterior rearview mirror system suitable for use on a vehicle, said exterior rearview mirror system comprising:

an exterior rearview mirror assembly having a reflective element supported at a mirror head portion mountable to a side of a vehicle equipped with said exterior rearview mirror system;

a mirror heating element disposed at a rear side of said reflective element and operable to heat said reflective element, wherein said mirror heating element comprises a PTC heating element;

a control operable to power said mirror heating element to heat said reflective element, wherein said control controls heating of said mirror heating element at least in part responsive to (a) a speed signal indicative of a speed of travel of the equipped vehicle and (b) a temperature signal indicative of a temperature at or on said reflective element and wherein said temperature signal is generated by a thermistor disposed at or in said mirror heating element;

wherein, responsive to said control receiving a speed signal indicative of vehicle movement, said control powers said mirror heating element; and wherein, responsive to said control receiving a speed signal indicative of little or no vehicle movement for a predetermined period of time, said control reduces power applied to said mirror heating element.

10. The exterior rearview mirror system of claim 9, wherein, responsive to said control receiving a speed signal indicative of little or no vehicle movement for a predetermined period of time of at least about three minutes, said control reduces power applied to said mirror heating element.

11. The exterior rearview mirror system of claim 9, wherein, responsive to said control receiving a speed signal indicative of little or no vehicle movement for a predetermined period of time of less than about ten minutes, said control reduces power applied to said mirror heating element.

12. The exterior rearview mirror system of claim 9, wherein said control is responsive to an ambient temperature signal indicative of a detected ambient temperature at or near said mirror assembly.

13. The exterior rearview mirror system of claim 9, wherein said control comprises a microcontroller of the equipped vehicle.

14. The exterior rearview mirror system of claim 9, wherein said control comprises an exterior mirror microcontroller of said exterior rearview mirror assembly of the equipped vehicle.

15. An exterior rearview mirror system suitable for use on a vehicle, said exterior rearview mirror system comprising:

an exterior rearview mirror assembly having a reflective element supported at a mirror head portion mountable to a side of a vehicle equipped with said exterior rearview mirror system;

a mirror heating element disposed at a rear side of said reflective element and operable to heat said reflective element, wherein said mirror heating element comprises a non-PTC heating element; and a control operable to power said mirror heating element to heat said reflective element, wherein said control controls heating of said mirror heating element responsive at least in part to (i) a speed signal indicative of a speed of travel of the equipped vehicle and (ii) a temperature signal indicative of a temperature at or on said reflective element and said temperature signal is generated by a thermistor disposed at or in said mirror heating element;

wherein, responsive to said control receiving a speed signal indicative of vehicle movement, said control powers said mirror heating element, and wherein, responsive to said control receiving a speed signal indicative of little or no vehicle movement for a predetermined period of time, said control reduces power applied to said mirror heating element.

16. The exterior rearview mirror system of claim 15, wherein said control reduces power applied to said mirror heating element following a period of time less than about ten minutes of said speed signal being indicative of there being little or no vehicle movement detected.

17. The exterior rearview mirror system of claim 15, wherein said control is responsive to an ambient temperature signal indicative of a detected ambient temperature at or near said mirror assembly.

18. The exterior rearview mirror system of claim 15, wherein said control, responsive to said control receiving a speed signal indicative of little or no vehicle movement for a predetermined period of time of at least about three minutes, said control reduces power applied to said mirror heating element.

19. The exterior rearview mirror system of claim 15, wherein said control comprises one of (a) a microcontroller of the equipped vehicle and (b) an exterior mirror microcontroller of said exterior rearview mirror assembly of the equipped vehicle.

* * * * *